US008671122B2

(12) United States Patent
Apte et al.

(10) Patent No.: US 8,671,122 B2
(45) Date of Patent: Mar. 11, 2014

(54) AUTOMATIC RECONCILIATION OF DISCREPANCIES IN ASSET ATTRIBUTE VALUES

(75) Inventors: Umesh Madhav Apte, San Ramon, CA (US); Jason Aron Alonzo, Fair Oaks, CA (US); John Leong Yee, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/346,143

(22) Filed: Jan. 9, 2012

(65) Prior Publication Data

US 2012/0117039 A1   May 10, 2012

Related U.S. Application Data

(62) Division of application No. 11/774,969, filed on Jul. 9, 2007, now Pat. No. 8,095,573.

(51) Int. Cl.
*G06F 17/30* (2006.01)

(52) U.S. Cl.
USPC ........... 707/805; 707/688; 707/690; 707/692; 707/694; 707/701; 707/702; 707/706; 707/713; 707/736; 707/791; 707/802; 705/37; 709/224; 709/220; 709/227; 715/736

(58) Field of Classification Search
USPC ......... 707/688, 690, 692, 694, 701, 702, 706, 707/713, 736, 791, 802, 805, 999.101, 707/999.102, 999.103; 705/37; 709/224, 709/220, 227; 715/736
See application file for complete search history.

(56) References Cited

U.S. PATENT DOCUMENTS

| 7,337,148 | B2 | 2/2008 | Xie et al. |
| 7,457,791 | B1 | 11/2008 | Garg et al. |
| 2002/0052791 | A1 | 5/2002 | Defede et al. |
| 2003/0165230 | A1 | 9/2003 | Reuss |
| 2003/0220747 | A1 | 11/2003 | Vailaya et al. |
| 2003/0225692 | A1 | 12/2003 | Bosch et al. |
| 2003/0233287 | A1 | 12/2003 | Sadler et al. |
| 2004/0215544 | A1 | 10/2004 | Formale et al. |
| 2005/0002380 | A1 | 1/2005 | Miller et al. |
| 2005/0102211 | A1 | 5/2005 | Freeny, Jr. |
| 2005/0114502 | A1 | 5/2005 | Raden et al. |
| 2006/0022048 | A1 | 2/2006 | Johnson |
| 2006/0080656 | A1 | 4/2006 | Cain et al. |
| 2006/0116842 | A1 | 6/2006 | Tarantola et al. |
| 2006/0129415 | A1* | 6/2006 | Thukral et al. ............ 705/1 |
| 2006/0178954 | A1 | 8/2006 | Thukral et al. |
| 2006/0259392 | A1 | 11/2006 | Rabenold et al. |
| 2006/0265408 | A1 | 11/2006 | Pini |
| 2006/0265503 | A1 | 11/2006 | Jones et al. |
| 2006/0288014 | A1 | 12/2006 | Edwards et al. |

OTHER PUBLICATIONS

U.S. Appl. No. 12/432,163.
Office Action dated Apr. 25, 2012 in U.S. Appl. No. 12/432,163.

(Continued)

*Primary Examiner* — Syling Yen
(74) *Attorney, Agent, or Firm* — Silicon Valley Patent Group LLP; Omkar K. Suryadevara

(57) ABSTRACT

Discrepancies in two sets of asset data for an organization are identified and automatically reconciled. One set of asset data may be compiled using automatic physical discovery software while the other set is from a financial system of the organization. Automatic reconciliation is performed according to user-configurable rules and corresponding user-configurable actions.

21 Claims, 6 Drawing Sheets

(56) References Cited

OTHER PUBLICATIONS

U.S. Appl. No. 11/848,588, pp. 35.
Office Action dated Jan. 8, 2009 in U.S. Appl. No. 11/848,588, pp. 23.
Amendment dated Jul. 8, 2009 in U.S. Appl. No. 11/848,588, pp. 12.
Final Office Action dated Nov. 12, 2009 in U.S. Appl. No. 11/848,588, pp. 33.
Amendment after Final Office Action dated Apr. 12, 2010 in U.S. Appl. No. 11/848,588, pp. 16.
Advisory Action and Instructions not to enter Amendment after Final Office Action dated Apr. 29, 2010 in U.S. Appl. No. 11/848,588, pp. 5.
Amendment dated May 12, 2010 in U.S. Appl. No. 11/848,588, pp. 14.
Office Action dated Aug. 5, 2010 in U.S. Appl. No. 11/848,588, pp. 28.
Amendment dated Nov. 5, 2010 in U.S. Appl. No. 11/848,588, pp. 17.
Final Office Action dated Feb. 3, 2011 in U.S. Appl. No. 11/848,588, pp. 29.
Amendment dated Jun. 3, 2011 in U.S. Appl. No. 11/848,588, pp. 11.
Examiner's Interview Summary dated Jun. 8, 2011 in U.S. Appl. No. 11/848,588, pp. 4.
U.S. Appl. No. 11/774,969, pp. 25.
Office Action dated Jul. 23, 2009 in U.S. Appl. No. 11/774,969, pp. 15.
Amendment dated Oct. 24, 2009 in U.S. Appl. No. 11/774,969, pp. 9.
Final Office Action dated Feb. 19, 2010 in U.S. Appl. No. 11/774,969, pp. 28.
Amendment after Final Office Action dated May 19, 2010 in U.S. Appl. No. 11/774,969, pp. 17.
Advisory Action dated Jun. 2, 2010 in U.S. Appl. No. 11/774,969, pp. 4.
Amendment dated Jun. 21, 2010 in U.S. Appl. No. 11/774,969, pp. 11.
Office Action dated Nov. 8, 2010 in U.S. Appl. No. 11/774,969, pp. 29.
Amendment dated Nov. 18, 2010 in U.S. Appl. No. 11/774,969, pp. 11.
Final Office Action dated Jan. 27, 2011 in U.S. Appl. No. 11/774,969, pp. 31.
Amendment dated Jun. 26, 2011 in U.S. Appl. No. 11/774,969, pp. 12.
Examiner's Interview Summary dated Jun. 29, 2011 in U.S. Appl. No. 11/774,969, pp. 4.
Notice of Allowance dated Sep. 7, 2011 in U.S. Appl. No. 11/774,969, pp. 18.
Applicant's Initiated Interview Summary dated Nov. 2, 2011 in U.S. Appl. No. 11/774,969, pp. 3.
Comments on Notice of Allowance and Statement of Substance of Interviews dated Dec. 7, 2011 in U.S. Appl. No. 11/774,969, p. 1.
Amendment dated Aug. 25, 2012 in U.S. Appl. No. 12/432,163.
Notice of Allowance dated Nov. 2, 2012 in U.S. Appl. No. 12/432,163.
Amendment after Notice of Allowance dated Dec. 21, 2012 in U.S. Appl. No. 12/432,163.
Response to Amendment dated Dec. 31, 2012 in U.S. Appl. No. 12/432,163.

\* cited by examiner

AUTOMATIC RECONCILIATION OF DISCREPANCIES IN ASSET ATTRIBUTE VALUES

CROSS-REFERENCE TO PARENT APPLICATION

This application is a divisional application of U.S. patent application Ser. No. 11/774,969 entitled "Automatic Reconciliation Of Discrepancies In Asset Attribute Values" filed on Jul. 9, 2007 by Umesh Madhav Apte et al, which is incorporated by reference herein in its entirety.

RE-VISIT NOTICE

Applicant(s) hereby rescind any disclaimer of claim scope in the parent application (namely U.S. application Ser. No. 11/774,969) and in the prosecution history thereof, and hereby advise the US Patent and Trademark Office (USPTO) that the claims in this divisional application may be broader than any claim in the parent application. Accordingly, Applicant(s) notify the USPTO of a need to re-visit the disclaimer of claim scope in the parent application, and to further re-visit all prior art cited in the parent application, including but not limited to cited references over which any disclaimer of claim scope was made in the parent application, and in the prosecution history thereof. See *Hakim v. Cannon Avent Group, PLC*, 479 F.3d 1313 (Fed. Cir. 2007). Moreover, any disclaimer made in the current application should not be read into or against the parent.

BACKGROUND OF THE INVENTION

This invention relates to the field of inventory management and more specifically, to a technique of automatically reconciling asset information, especially physical asset information which has been compiled through a physical or automatic discovery technique.

Large organizations often have trouble keeping track of their assets. The assets are purchased and deployed throughout the organization and then become increasingly difficult to account for. Accounting of these assets is necessary to maintain compliance with regard to leases, material financial impact of the assets, and software license compliance among other things.

Often times, an organization will rely on the information that is stored in their financial system. However, this rarely reflects the real world of assets that are actually deployed within the organization. This information lacks the impact of events, such as asset disposal, unrecorded sales, theft, and so forth. Increasingly, organizations are deploying asset tracking (i.e., physical or automatic discovery) mechanisms that can retrieve the actual asset information as it is utilized in the organization. Typically, the asset tracking data varies from the information stored in the financial system, and it is desirable to reconcile any discrepancies.

Organizations want to take the information that comes from the physical discovery and reconcile it back to their financial system. Especially in a large organization, there are potentially a very large number of discrepancies to check and reconcile. This task is potentially very burdensome and time consuming. And in the time it takes to perform a reconciliation, more changes in the asset information may have occurred.

Therefore, there is a need for a technique of automating the reconciliation of discrepancies in asset attribute values.

BRIEF SUMMARY OF THE INVENTION

Discrepancies in two sets of asset data for an organization are identified and automatically reconciled. One set of asset data may be compiled using automatic physical discovery software while the other set is from a financial system of the organization. Automatic reconciliation is performed according to user-configurable rules and corresponding user-configurable actions.

In a specific implementation, the invention is a method including: providing a first repository with first asset information; providing a second repository with second asset information; comparing the first asset information with the second asset information to find exceptions, where an exception occurs when a user-configurable rule is satisfied; and performing an automatic user-configurable action for an exception.

The first asset information may be created using a first technique and the second asset information is created using a second technique, different from the first technique. The first asset information may be created using asset discovery software. The automatic user-configurable action may include updating the second asset information with an attribute or attribute value found in the first asset information. The automatic user-configurable action may include deleting an attribute or attribute value from the second asset information. The automatic user-configurable action may include making a change to the second asset information.

The automatic user-configurable action may include adding the second asset information using the first asset information. The automatic user-configurable action may include retiring an the second asset based off of missing first asset information. The automatic user-configurable action may include making a change to the second asset information In a specific implementation, the invention is a method including: providing first asset information which is compiled through automatic discovery; providing second asset information; comparing the first asset information with the second asset information to find exceptions, where an exception occurs when a user-configurable rule is satisfied; and providing user-configurable actions that can be executed for an exception, where there is a user-selectable option to enable or disable automatic execution of a user-configurable action for an exception.

When automatic execution is enabled for a user-configurable action, execution of the action is automatic without requiring user intervention or authorization. The automatic user-configurable action may include updating the second asset information with an attribute or attribute value found in the first asset information. The automatic user-configurable action may include deleting an attribute or attribute value from the second asset information.

When automatic execution for a user-configurable action is enabled and a restriction to the user-action is specified, automatic execution of the user-configurable action may be prevented when the restriction is satisfied. In an implementation, the restriction is satisfied when an IP address of a device in the first asset information is within a range of IP addresses.

The technique may include logging all actions automatically executed on the second asset information. The log may be stored in a database or repository. This log may be used to support an undo capability to undo changes made during automatic reconciliation. The undo feature is optional and may or may not be included in a specific implementation of the invention.

Other objects, features, and advantages of the present invention will become apparent upon consideration of the

DETAILED DESCRIPTION OF THE INVENTION

Figure 1:
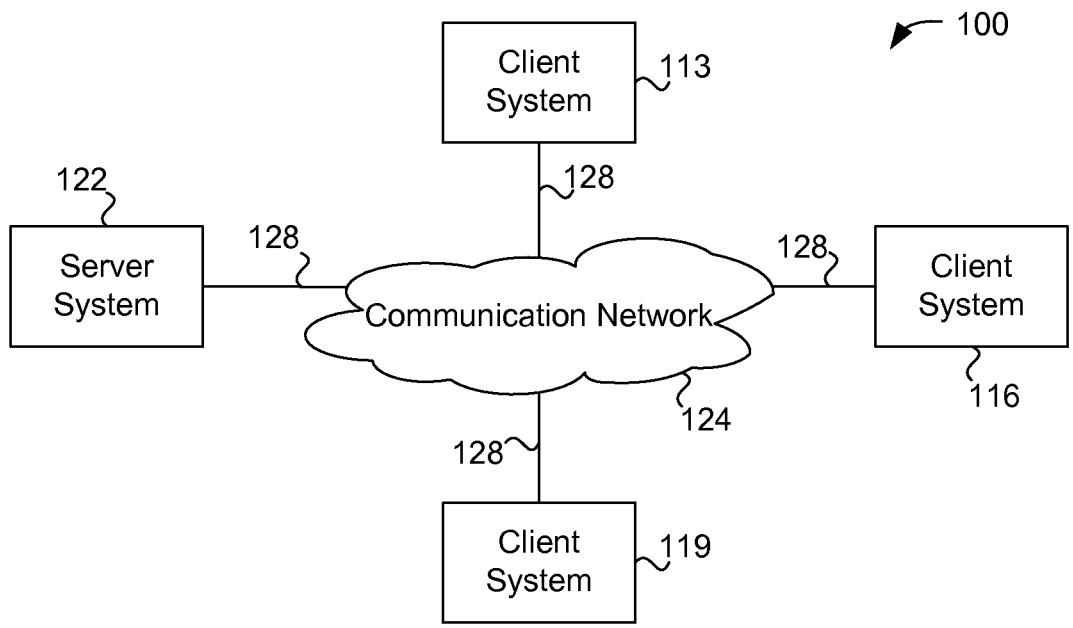
FIG. 1 shows a block diagram of a client-server system and network in which an embodiment of the invention may be implemented.

FIG. 1 is a simplified block diagram of a distributed computer network 100 which may include an implementation of the present invention. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention has been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

According to the teachings of the present invention, client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
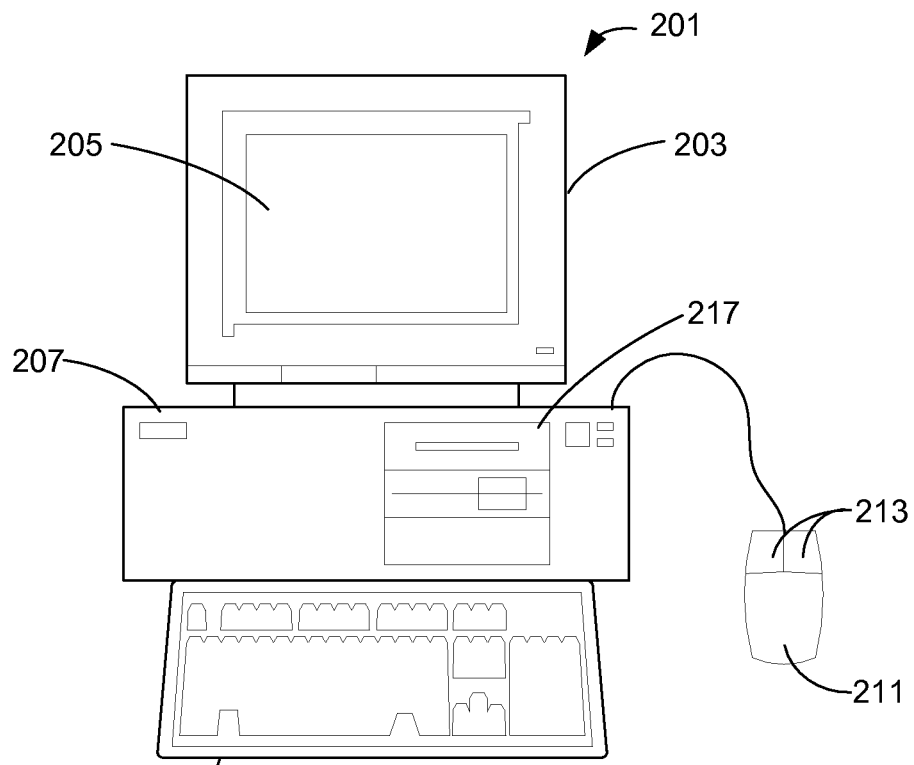
FIG. 2 shows a more detailed diagram of an exemplary client or computer which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
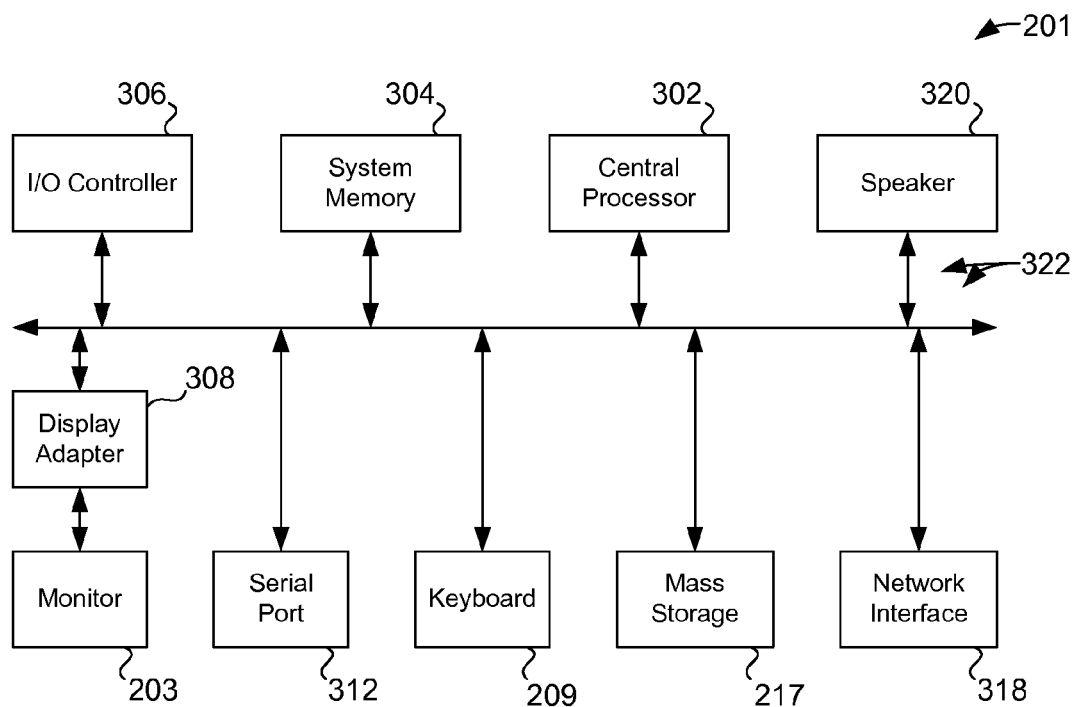
FIG. 3 shows a system block diagram of a client computer system used to provide a user interface according to the invention.

FIG. 3 shows a system block diagram of computer system 201 which may be used to execute software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
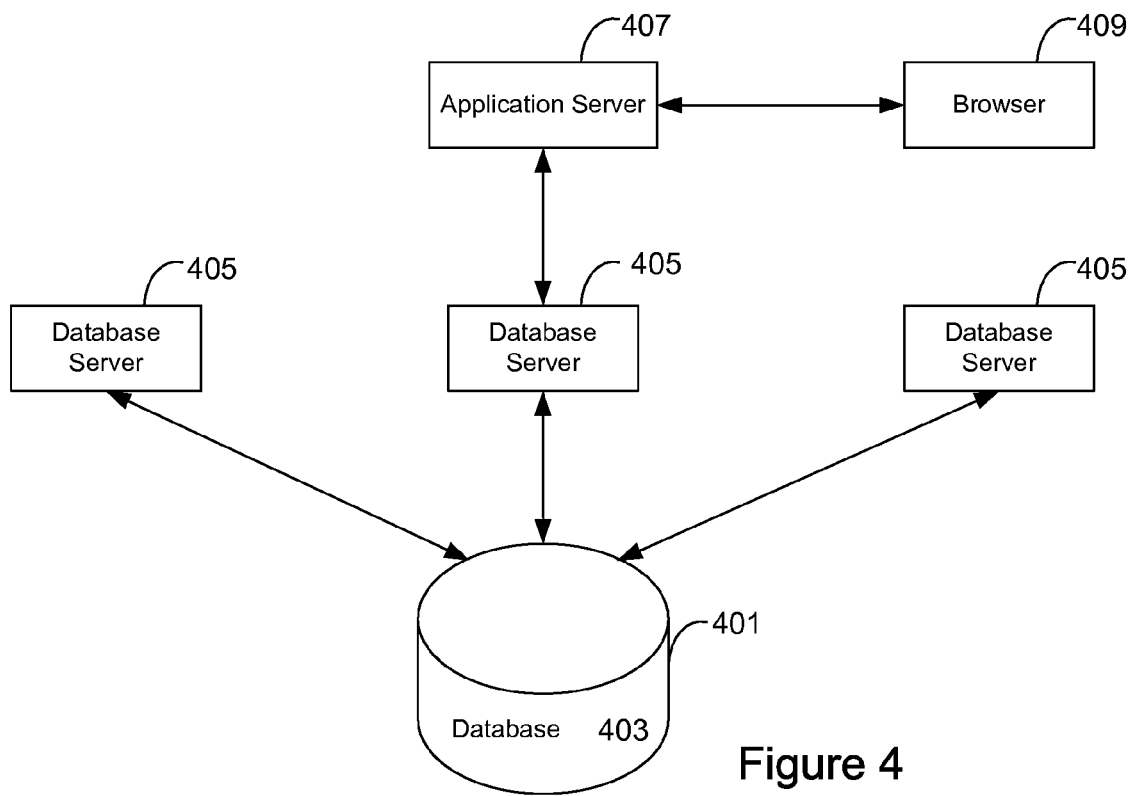
FIG. 4 shows data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
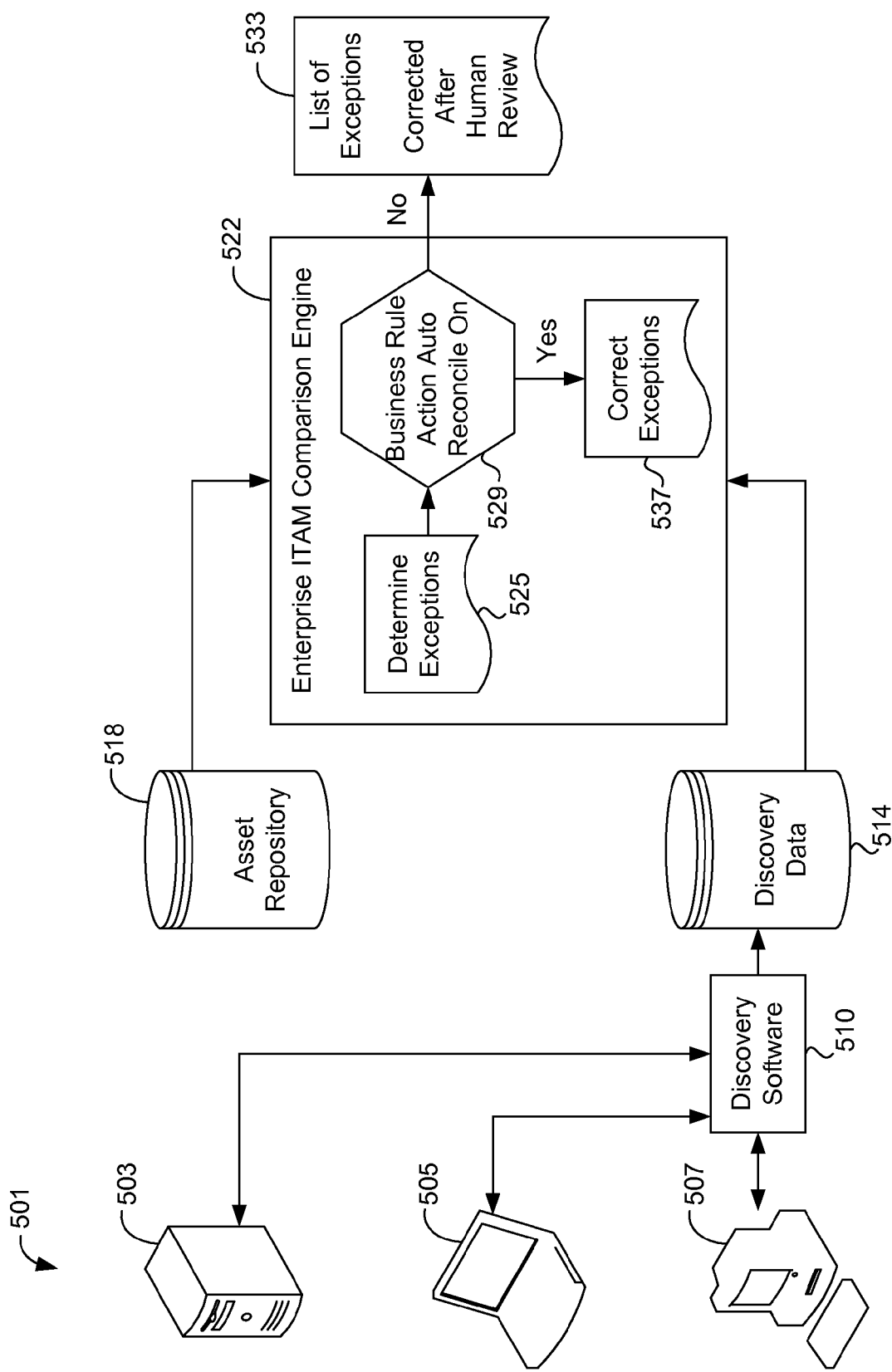
FIG. 5 shows an overview of an asset management system of the invention.

FIG. 5 shows an overview of an asset management system of the invention. The system tracks assets 501 including servers 503, laptops 505, computers 507, and other systems or devices. Discovery software 510 finds the assets of the system and records the asset tracking information received from the devices in a database, discovery data 514, or other data repository. For example, the discovery software connects to the network, dynamically collects asset information including the physical attributes or attribute values of the assets, and stores the asset information found in discovery database 514. In an implementation, when a device connects to the system network, the discovery software inquires and receives asset information.

The asset information (e.g., physical attributes or attribute values of an information technology asset) may include information such as serial number (e.g., 61RC5B1), manufacturer (e.g., Dell, HP, Compaq, IBM, Lenovo, Acer, Shuttle, ASUS), model (e.g., Latitude D620, Presario), primary user (e.g., John Doe, Jane Smith), location (e.g., third floor, building E, Pleasanton, Calif.; seventh floor, suite 710, Santa Clara, Calif.), machine type, network address of machine, machine name, user configured physical attributes or attribute values (such as RAM, CPUs, or number of CPUs or cores), and software installation and usage.

Discovery data 514 is a first set of asset information for an organization. This first set of asset information may be referred to as discovered asset information or dynamic asset information since the information is discovered dynamically using software. Any automated technique of determining the assets of a network may be used.

In the organization, there is typically a second set of asset information that that has been input separately, perhaps as part of the financial system. In typical operation and use of assets, some of the asset information may change due to employee turnover, internal employee transfers, theft, and obsolescence. Moreover, for example, when an asset is purchased, asset information is input into an asset repository or database 518. This second set of asset information may be referred as input asset information or static asset information, which contrasts with asset information that is dynamically discovered using software.

There may be discrepancies between the dynamic and static sets of asset information. For example, typographical or other user errors may occur when inputting the static asset information. When a computer was first purchased, it was assigned to a particular department, but then transferred to a different department. The dynamic asset information may show the computer as part of the new department, but the static asset information has not yet been updated. A laptop may be physically transferred to a retained employee after another employee is laid-off; however, the new custodian of the asset may not be updated in the static asset information. An asset may be purchased and deployed and never captured in the static asset repository. The computer may have additional software installed without authorization getting recorded in the static system. Additionally, computers may get used in a mode where four physical CPUs work as eight virtual CPUs and it is likely that static asset repository may not have captured it.

A comparison engine 522 compares discovery data 514 (i.e., dynamic asset information) against the asset repository data 518 (i.e., static asset information) and determines discrepancies in the asset tracking data. A technique of the comparison engine determines if there are exceptions 525, which occur when there are discrepancies between the two sets of asset tracking data.

The exceptions may be determined based on a one or more business rules. These business rules provide the logic (e.g., through Boolean comparisons) to determine whether an exception has occurred. Business rules may also be used to suggest actions to correct the discrepancies. Therefore, there may be a first set of rules to determine when an exception has occurred and a second set of rules to determine how to automatically correct the discrepancies found.

Figure 6:
FIG. 6 shows an example of a computer screen where a user can specify the business rules for determining when a discrepancy occurs through a graphical user interface.

A user may specify a business rule using any one or a combination of techniques including Boolean statements or expressions, programming language, graphical user, scripts, and others. FIG. 6 shows an example of a computer screen where a user can specify the business rules for determining when a discrepancy occurs through a graphical user interface. There is a section of the interface where the user can define a rule set. For each rule, there are fields for first attribute type, first attribute name, operator, second attribute type, and second attribute name. For each field, there is a pull-down which will allow the user to make a selection. Some examples of operators include equal ("="), not equal to ("< >"), greater than (">"), and less than ("<").

In an implementation of the invention, there is an option 529 to turn on or off automatic reconciliation of the discrepancies in the sets of asset data. When the automatic reconciliation option is off, the determined exceptions are provided 533 to the user in a list 533, table, or other format. This list may be printed or provided on the computer screen. The user can review the exceptions and manually enter corrections.

Figure 7:
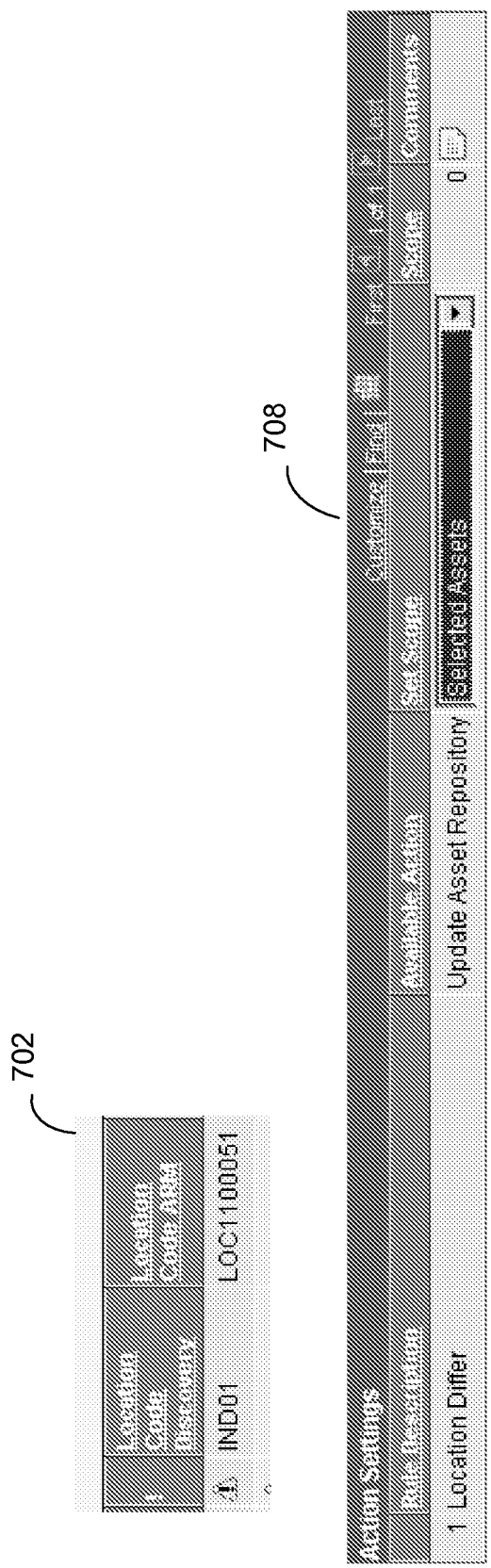
FIG. 7 shows examples of a screens resulting from comparing the discovered asset data to the asset repository data.

FIG. 7 shows examples of a screens resulting from comparing the discovered asset data to the asset repository data. A screen portion 702 provides and sample exception listing which lists the attributes as stored in the asset repository compared to how they exist in the discovery data. In the figure, the location code determined through discovery is IND01, which is different from the location code, LOC1100051, in the asset repository. In an implementation, the exceptions listing provides a listing of the actual physical attributes or attribute values discovered (e.g., in a first column) in comparison with the expected physical attributes (e.g., in a second column) from the asset repository.

When the automatic reconciliation option is on, the discrepancies in the sets of asset data will be automatically corrected or acted upon 537. The discrepancies are corrected based on a set of business rules, which may be provided or specified by the user, in a similar fashion as discussed above and as shown in the user screen in FIG. 8.

Figure 8:
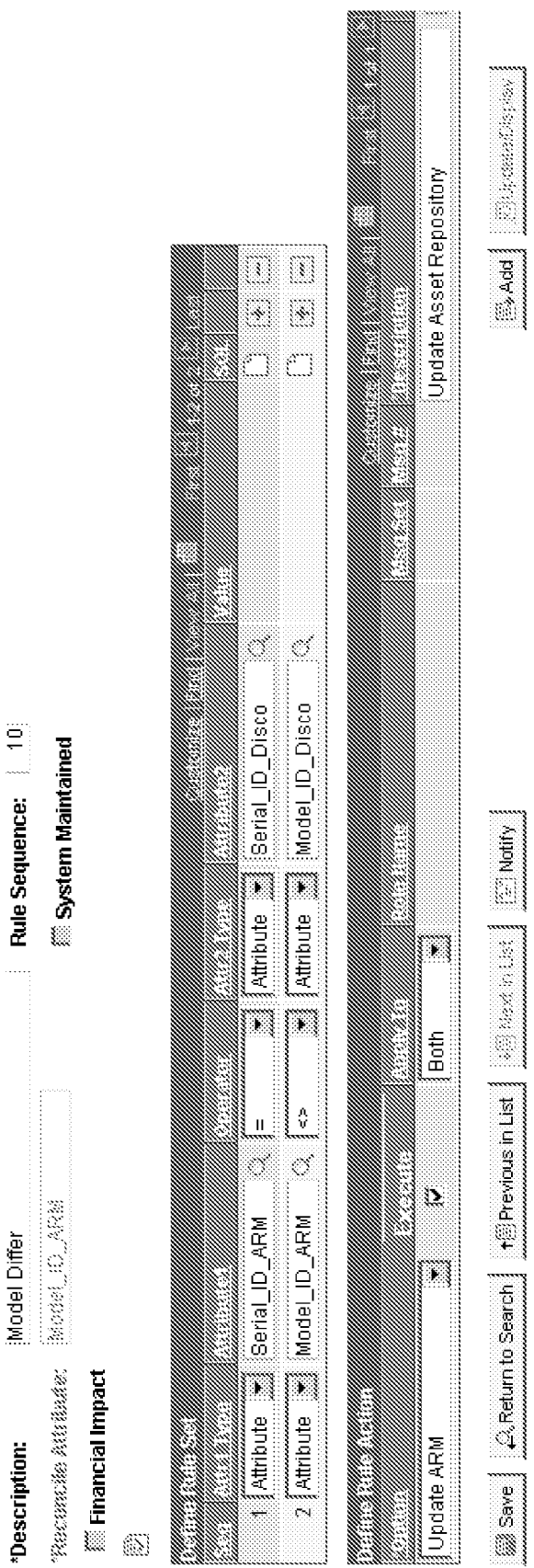
FIG. 8 shows a user screen for specifying business rules and corresponding actions, and an option to enable automatic execution of an action.

In the screen in FIG. 8, there is a define rule set portion of a business rule, and a define rule action portion. Rules may be defined in a fashion as discussed above. In the define rule action section in the screen, there is a box in the execute column which the user can check to turn on automatic execution for this particular rule and action. Automatic reconciliation may be turned on on an action-by-action basis, a selected group of actions, or for all actions. In the define rule action section, the action is listed first. The first indentation beneath that are the attributes that the action can be applied to be followed by any restrictions or applied logic.

As shown in FIG. 7, the user can specify actions to take place for an exception. In a screen portion 708, a particular action takes place for a given condition. For example, when location differs, such as shown in screen portion 702, the rule shown in screen portion 708 indicates that the asset repository is to be updated with the discovered information. The system of the invention will automatically execute the rules to reconcile the exceptions. In this case, upon finding a location code discrepancy, the system will automatically update the asset repository with the location code discovered. More specifically, the location IND01 would overwrite the location stored in the asset repository.

In an implementation, the system includes an option to not allow automatic reconciliation for certain conditions. For example, the user may specify a range of IP addresses where automatic reconciliation is not performed. These IP addresses may be addresses for virtual private network (VPN) or remotely connected users.

Some discrepancies require human review such as, for example, when an asset is found in the first system and an equivalent asset is not found in the second system it is possible that an incorrect serial ID has been entered into the second system (i.e., perhaps caused by a typographical error). While the two assets are the same there is no way for the comparison engine to recognize that. The action to correct the second system serial ID must be done manually.

Another example of where human intervention is likely needed, but not required, is a scenario where a new computer gets allotted to an employee who does not use it for a few weeks and continues to use the old computer. Associated actions with the business rule may be to either move the computer to inventory or to retire an asset. Both actions probably need human review and most likely would not be performed automatically.

In a specific implementation, a technique of the invention has the following flow.

1. Provide a first repository with first asset information.
2. Provide a second repository with second asset information. The first asset information may be created using a first technique while the second asset information is created using a second technique, different from the first technique. For example, the first asset information may be created through asset discovery software.
3. Compare the first asset information with the second asset information to find exceptions, where an exception occurs when a user-configurable rule is satisfied.

4. Perform an automatic user-configurable action for an exception. The action may be making a change to the second asset information in some fashion (e.g., an addition, modification, deletion, or retirement). Specifically, the action may be updating the second asset information with an attribute or attribute value found in the first asset information. The action may be deleting an attribute or attribute value from the second asset information.

Automatic reconciliation may be provided by way of an option that enable or disables automation execution of a user-configurable action. When automatic execution for a user-configurable action is enabled and a restriction to the user-action is specified, automatic execution of the user-configurable action may be prevented when the restriction is satisfied. For example, the restriction may be satisfied when an IP address of a device in the first asset information is within a range of IP addresses.

5. Optionally log all actions that occur during automatic execution. Since actions are preformed automatically without user intervention or authorization, the log will allow a user to see the actions that actually took place. Further, this log may support an undo feature of the invention, so changes can be undone because, for example, a mistake occurred.

A specific implementation of a flow for automatic reconciliation of asset information is presented in this patent, but it should be understood that the invention is not limited to the specific flow and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

Some other rules to find exceptions include business units differ, custodian department identification differs, custodian differs, location differs, model differs, asset not in discovery data, asset not in asset repository, and unauthorized software, and any combination of these. Some attributes reconciled with delivered rules include serial identification or ID, business unit, department, model, manufacturer, location, custodian, software, and user-defined attributes, and any combination of these.

In a specific implementation, in the case of unauthorized software, a software rule determines those assets that have software licenses that they are not authorized for. The system does not allow users to modify the logic in this rule.

Some intelligent rules and action include:

Update the ARM: business unit (e.g., interunit transfer), model, manufacturer, location, Custodian, Department (e.g., intraunit transfer). For location, custodian, and department, the business unit should be in the same set ID (i.e., family of business units). The update ARM action will replace the values that exist in the second asset for the model and manufacturer. For location and custodian the new information will be added with the specified date, while preserving the prior values (effective dating). Interunit and Intraunit transfer can be initiated in order to update the business unit and the department.

Asset Additions/Capitalizations: serial ID not in asset repository. This applies to those assets that are discovered but a matching asset is not found in the asset repository. This can occur through typographical error when entering the asset in the second system or the asset may never have been added at all. The action has built in logic that provides for: an asset should be added before being capitalized; the addition can be executed directly or routed through workflow; capitalizations are handled through workflow only.

Asset Retirements: serial ID not in discovery. This applies to those assets that are in the asset repository but have not been discovered. This may occur when a newly deployed asset has been added to the second system, but is not yet on the physical network. This prevents the asset from being discovered. Another example are assets that have been stolen and physically removed from the physical network. The action has built in logic that provides for: nonfinancial assets can be retired; financial assets are routed through workflow.

Move Assets to Warehouse Location Enabling Redeployment: serial ID not in discovery. Some assets may be removed from the field for maintenance or other reasons. Assets that are removed from the physical network will stop showing up in the discovered system. Assets that meet this criteria will still show as a discrepancy but can be corrected by moving the asset in the second system into a warehouse state, that prevents it from being picked up from the asset repository for reconciliation.

Email: All—Primary User, Primary User's Manager, Custodian, Custodian Manager, Software Group owner (software only).

The system allows automatically reconciling of the asset attributes or attribute values where there are discrepancies. Users will benefit from an option that allows reconciliation actions to process automatically without human intervention. The actions that can be automatically executed are controlled by the end user and configurable using business rules. The business rules will allow for the system, in some cases, to automatically correct all of the discrepancies that exist for an asset. This will create an end-to-end solution that will automatically reconcile the physical network to the financial network without needing someone to review the discrepancy and act on it.

The invention will reduce the total amount of time that is needed to reconcile assets between the physical and financial system. The system takes into account that some discrepancies may need to be reviewed while others can be easily corrected without human intervention. Because the system is configurable, it will allow the user to focus on which discrepancies are the most important ultimately making the user and the system more productive.

In addition, another aspect of the invention is that the reconciliation process is allowed to be run at preset times and intervals (e.g., run the reconciliation every two weeks at 2 a.m.). This will allow for an overall improvement of hardware efficiency. By scheduling the process to automatically correct discrepancies when computing hardware is less used, it will free up the hardware for the time when demand is high for computing cycles. The system will thus be able to better handle those actions that require user intervention to correct because the volume will have been lowered.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A computer-implemented method comprising:
storing first asset information comprising a first attribute, wherein the first asset information is obtained using a first technique;
storing second asset information comprising a second attribute corresponding to the first attribute, wherein the second asset information is obtained using a second technique different from the first technique;
receiving a first input on a first option displayed on a computer screen;
wherein the first option is to enable or disable automatic execution of a first action when a first rule is satisfied;
wherein a second option is to turn on or off automatic reconciliation of discrepancies;
in response to the automatic reconciliation being turned on by enabling the second option, using at least one computer processor to compare a first attribute value in the first asset information with a second attribute value in the second asset information to check if the first rule is satisfied;
wherein the first action is to change the second attribute value in the second asset information, in response to finding an exception based on the comparison at least on determining that the method is configured with the first option enabled and the second option enabled; and
wherein the exception occurs when the first attribute value in the first asset information does not match the second attribute value in the second asset information at least on determining that the method is configured with the first option disabled and the second option enabled.

2. The method of claim 1 wherein:
the change by the first action comprises deletion of the second attribute value from the second asset information.

3. The method of claim 1 further comprising:
logging all actions automatically executed on the second asset information.

4. The method of claim 1 wherein:
when automatic execution is enabled for the first action by the first input, execution of the first action is automatic without requiring user authorization when the first rule is satisfied.

5. The method of claim 1 wherein:
when the second attribute value is compared to the first attribute value prior to performing the first action, the second attribute value in the second repository does not match the first attribute value; and
after performing the first action, an altered second attribute value in the second repository matches the first attribute value.

6. The method of claim 1 wherein:
the first asset information is compiled through automatic discovery.

7. The method of claim 6 wherein:
the second asset information is comprised in a financial system.

8. The method of claim 1 further comprising:
when the first action is enabled by the first input, using the at least one computer processor to check if a restriction is satisfied;
when the restriction is not satisfied and the first rule is satisfied, performing the first action; and
when the restriction is satisfied and the first rule is satisfied, not performing the first action.

9. The method of claim 8 wherein:
the restriction is satisfied when an IP address of a device in the first asset information is within a range of IP addresses.

10. The method of claim 1 wherein:
when the automatic reconciliation is turned off by the second option, the exception on being determined, is provided as output.

11. A non-transitory computer-readable storage medium comprising instructions to one or more processors to:
store first asset information comprising a first attribute, wherein the first asset information is obtained using a first technique;
store second asset information comprising a second attribute corresponding to the first attribute, wherein the second asset information is obtained using a second technique different from the first technique;
receive a first input on a first option displayed on a computer screen;
wherein the first option is to enable or disable automatic execution of a first action when a first rule is satisfied;
wherein a second option is to turn on or off automatic reconciliation of discrepancies;
respond to the automatic reconciliation being turned on by enabling the second option, by comparing a first attribute value in the first asset information with a second attribute value in the second asset information to check if the first rule is satisfied;
wherein the first action is to change the second attribute value in the second asset information, in response to finding an exception based on the comparison at least on determining that the one or more processors are configured with the first option enabled and the second option enabled; and
wherein the exception occurs when the first attribute value in the first asset information does not match the second attribute value in the second asset information at least on determining that the one or more processors are configured with the first option disabled and the second option enabled.

12. The non-transitory computer-readable storage medium of claim 11 wherein:
the change by the first action comprises deletion of the second attribute value from the second asset information.

13. The non-transitory computer-readable storage medium of claim 11 further comprising instructions to:
log all actions automatically executed on the second asset information.

14. The non-transitory computer-readable storage medium of claim 11 further comprising:
responsive to automatic execution being enabled for the first action by the first input, instructions to execute the first action automatically without requiring user authorization when the first rule is satisfied.

15. The non-transitory computer-readable storage medium of claim 11 wherein:
when the second attribute value is compared to the first attribute value prior to performing the first action, the second attribute value in the second repository does not match the first attribute value; and after performance of the first action, an altered second attribute value in the second repository matches the first attribute value.

16. The non-transitory computer-readable storage medium of claim 11 wherein:
the first asset information is compiled through automatic discovery.

17. The non-transitory computer-readable storage medium of claim 16 wherein:
the second asset information is comprised in a financial system.

18. The non-transitory computer-readable storage medium of claim 11 further comprising:
responsive to the first action being enabled by the first input, instructions to use the at least one computer processor to check if a restriction is satisfied; and
responsive to the restriction being not satisfied and the first rule being satisfied, instructions to perform the first action.

19. The non-transitory computer-readable storage medium of claim 18 wherein:
the restriction is satisfied when an IP address of a device in the first asset information is within a range of IP addresses.

20. The non-transitory computer-readable storage medium of claim 11 further comprising:
responsive to the automatic reconciliation being turned off by the second option, and the exception being determined, instructions to provide at least the exception as output.

21. One or more computers comprising:
at least one processor and a memory;
wherein the memory comprises:
instructions to store first asset information comprising a first attribute, wherein the first asset information is obtained using a first technique;
instructions to store second asset information comprising a second attribute corresponding to the first attribute, wherein the second asset information is obtained using a second technique different from the first technique;
instructions to receive a first input on a first option displayed on a computer screen;
wherein the first option is to enable or disable automatic execution of a first action when a first rule is satisfied;
wherein a second option is to turn on or off automatic reconciliation of discrepancies;
responsive to the automatic reconciliation being turned on by enabling the second option, instructions to compare a first attribute value in the first asset information with a second attribute value in the second asset information to check if the first rule is satisfied;
wherein the first action is to change the second attribute value in the second asset information, in response to finding an exception based on the comparison at least on determining that the one or more computers are configured with the first option enabled and the second option enabled; and
wherein the exception occurs when the first attribute value in the first asset information does not match the second attribute value in the second asset information at least on determining that the one or more processors are configured with the first option disabled and the second option enabled.

* * * * *

UNITED STATES PATENT AND TRADEMARK OFFICE
CERTIFICATE OF CORRECTION

PATENT NO.        : 8,671,122 B2
APPLICATION NO.   : 13/346143
DATED             : March 11, 2014
INVENTOR(S)       : Apte et al.

It is certified that error appears in the above-identified patent and that said Letters Patent is hereby corrected as shown below:

In the Specification

In column 2, line 32, delete "retiring an" and insert -- retiring --, therefor.

In column 2, line 34, delete "information" and insert -- information. --, therefor.

In column 6, line 63, delete "that that" and insert -- that --, therefor.

Signed and Sealed this
Eighth Day of July, 2014

Michelle K. Lee
*Deputy Director of the United States Patent and Trademark Office*